(12) United States Patent
Prabhakar et al.

(10) Patent No.: US 12,267,721 B2
(45) Date of Patent: Apr. 1, 2025

(54) USER EQUIPMENT NETWORK SLICE INFORMATION STORAGE AND PACKET DATA UNIT SESSION ESTABLISHMENT FOR NEW RADIO

(71) Applicant: Apple Inc., Cupertino, CA (US)

(72) Inventors: Alosious Pradeep Prabhakar, Singapore (SG); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/521,386

(22) Filed: Nov. 28, 2023

(65) Prior Publication Data
US 2024/0098556 A1 Mar. 21, 2024

Related U.S. Application Data

(62) Division of application No. 17/302,365, filed on Apr. 30, 2021, now Pat. No. 11,843,966.

(60) Provisional application No. 63/018,946, filed on May 1, 2020.

(51) Int. Cl.
| | |
|---|---|
| *H04W 28/02* | (2009.01) |
| *H04W 8/22* | (2009.01) |
| *H04W 48/18* | (2009.01) |
| *H04W 76/16* | (2018.01) |
| *H04W 84/04* | (2009.01) |
| *H04W 84/12* | (2009.01) |

(52) U.S. Cl.
CPC ........ *H04W 28/0268* (2013.01); *H04W 8/22* (2013.01); *H04W 48/18* (2013.01); *H04W 76/16* (2018.02); *H04W 84/042* (2013.01); *H04W 84/12* (2013.01)

(58) Field of Classification Search
CPC ... H04W 28/0268; H04W 8/22; H04W 48/18; H04W 76/16; H04W 84/042; H04W 84/12; H04W 48/16; H04W 76/12; H04W 88/06
USPC ....................................... 370/229, 230, 231
See application file for complete search history.

(56) References Cited

U.S. PATENT DOCUMENTS

| | | | |
|---|---|---|---|
| 2019/0342761 A1* | 11/2019 | Yu ........................ | H04W 8/18 |
| 2019/0357128 A1* | 11/2019 | Casati ................... | H04W 60/00 |
| 2020/0169921 A1* | 5/2020 | Zhu ........................ | H04W 8/02 |

* cited by examiner

*Primary Examiner* — Obaidul Huq
(74) *Attorney, Agent, or Firm* — Fay Kaplun & Marcin, LLP

(57) ABSTRACT

A user equipment (UE) is configured to store information related to network slices. The UE receives network slice related information associated with a first public land mobile network (PLMN), stores the network slice related information in a database locally at the UE, identifies a predetermined condition and removes at least a portion of the network slice information associated with the first PLMN based on camping on a second PLMN and the predetermined condition.

20 Claims, 9 Drawing Sheets

| Slice/Service Type 505 | SST value 510 | Charaterstics 515 |
|---|---|---|
| Third Party Services | 4 | News feed, streaming music, messaging, video chat |
| V2X | 4 | Vehicle to Everything Communications |
| VPN (Corporate) | 6 | VPNs for a specific corporate group |
| Third Party Services | 7 | Gaming, streaming service, non-guaranteed bit rate |
| Gaming | 8 | Guaranteed bit rate 5G quality of service indicator =3 |
| Video over 5G | 9 | Guaranteed bit rate 5G quality of service indicator =2 |

Table 500

Fig. 5

USER EQUIPMENT NETWORK SLICE INFORMATION STORAGE AND PACKET DATA UNIT SESSION ESTABLISHMENT FOR NEW RADIO

PRIORITY/INCORPORATION BY REFERENCE

This application claims priority to U.S. Provisional Application Ser. No. 63/018,946 filed May 1, 2020 and entitled "User Equipment Network Slice Information Storage and Packet Data Unit Session Establishment for New Radio," the entirety of which is hereby incorporated herein by reference.

BACKGROUND

A user equipment (UE) may connect to a network that includes multiple network slices. Generally, a network slice refers to an end-to-end logical network that is configured to provide a particular service and/or possess particular network characteristics. Each network slice may be isolated from one another but run on a shared physical network infrastructure. Thus, each network slice may share network resources but facilitate different functionality.

A public land mobile network (PLMN) may be associated with a particular set of network slice related information. The network slice related information may be utilized by the UE to access the corresponding network services. If the UE is not provisioned with the network slice related information prior to camping on the PLMN, the UE may have to wait to be provisioned with the network slice related information by the PLMN before the UE is able to access the corresponding network services. If the UE is provisioned with the network slice related information prior to camping on the PLMN, the UE may be able to quickly access the corresponding network services. However, it is an inefficient use of memory resources for the UE to store network slice related information that is unlikely to be utilized by the UE.

The UE and a data network may exchange data associated with a network slice via a packet data unit (PDU) session. During PDU session establishment, the UE may determine whether to route traffic to the data network via a new PDU session or utilize an existing PDU session. For example, at a first time, the UE may be configured with multiple existing PDU sessions. At a second time, an application running on the UE may trigger PDU session establishment while the one or more existing PDU sessions are still configured. During a PDU session establishment procedure, the UE may determine that the data flow for this application may be routed over one or more existing PDU sessions. Thus, PDU session establishment may include the UE determining whether to route the traffic for the application to the data network over one of the existing PDU sessions or a new PDU session.

There are various aspects related to the storage of network slice related information and PDU session establishment that are up to a UE implementation. Accordingly, there exists a need for mechanisms configured to address these aspects of network slicing while maintaining an adequate user experience at the UE.

SUMMARY

Some exemplary embodiments are related to a processor of a user equipment (UE) configured to perform operations. The operations include receiving network slice related information associated with a first public land mobile network (PLMN), storing the network slice related information in a database locally at the UE, identifying a predetermined condition and removing at least a portion of the network slice information associated with the first PLMN based on camping on a second PLMN and the predetermined condition.

Other exemplary embodiments are related to a method performed by a user equipment (UE). The method includes determining that an application running on the UE is to utilize a packet data unit (PDU) session for a network service associated with a single network slice selection assistance information (S-NSSAI), determining whether to select an existing PDU session or a new PDU session as the PDU session for the network service and transmitting a PDU session modification request or a PDU session establishment request to the network, the request indicating the selected PDU session.

Still further exemplary embodiments are related to a non-transitory computer readable storage medium comprising a set of instructions that when executed cause a processor of a user equipment (UE) to perform operations. The operations include receiving a network slice related information associated with a first public land mobile network (PLMN), determining that an application of the UE is to establish a packet data unit (PDU) session using a wireless local area network (WLAN) based on the network slice related information, connecting to the WLAN and transmitting a PDU session establishment request to the WLAN.

BRIEF DESCRIPTION OF THE DRAWINGS

FIG. 5 shows a table that illustrates an exemplary set of slice/service type (SST) slices.

DETAILED DESCRIPTION

Figure 1:
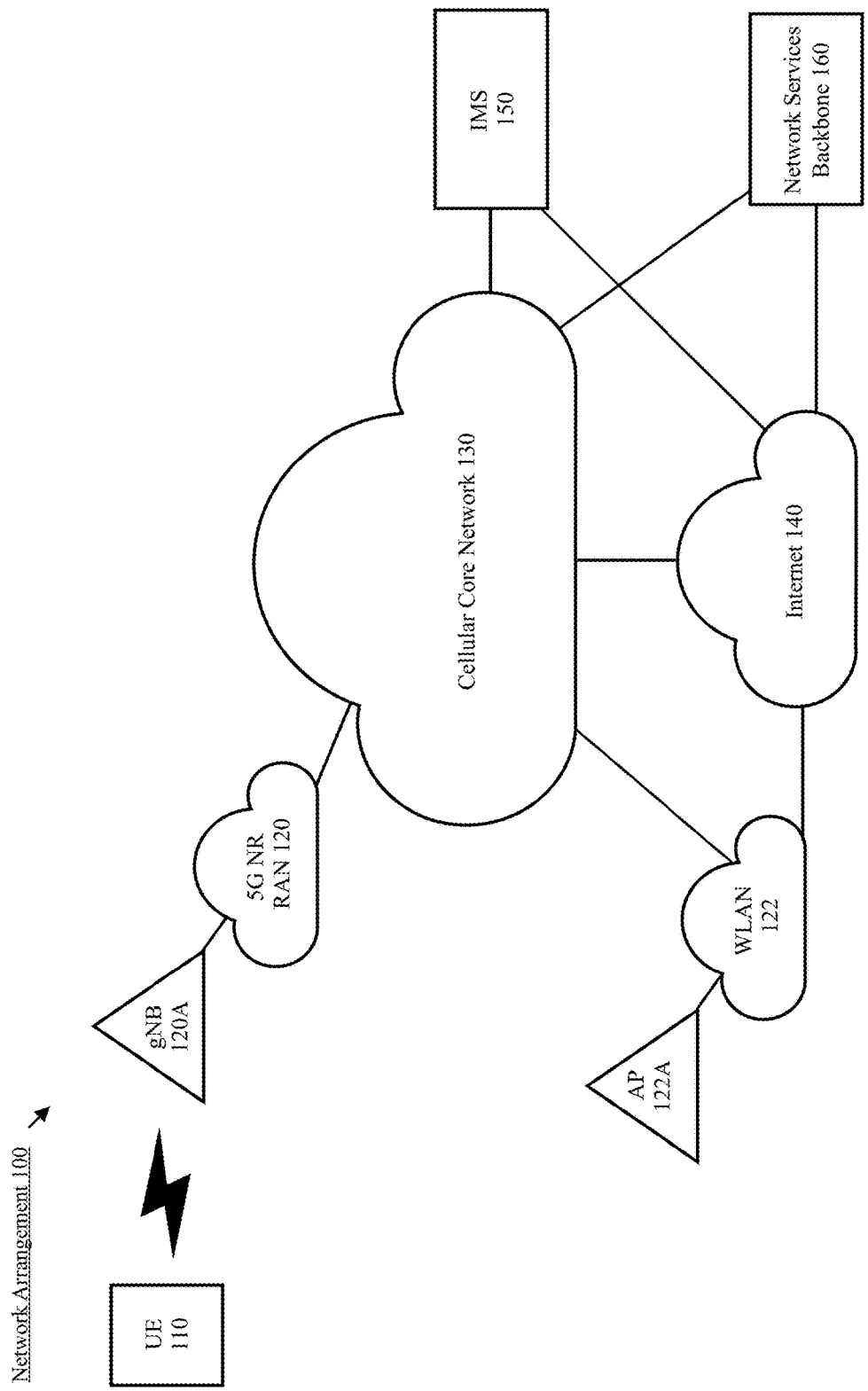
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to the behavior of a user equipment (UE) with regard to various aspects of network slicing. In a first aspect, the exemplary embodiments relate to the storage of network slice related information locally at the UE. In a second aspect, the exemplary embodiments relate to techniques that may be implemented during a protocol data unit (PDU) session establishment procedure. In a third aspect, the exemplary embodiments relate to the UE utilizing non-third generation partnership program (3GPP) access technology to access a network slice while roaming. Specific examples of each of these exemplary aspects will be described in more detail below.

The exemplary embodiments are described with regard to a user equipment (UE). However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a fifth generation (5G) network that includes network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different service and to possess different network characteristics.

Those skilled in the art will understand that 5G may support use cases such as enhanced mobile broadband (eMBB), massive machine type communication (mMTC) and ultra-reliable low latency communication (URLLC). Each of these types of use cases may relate to various different types of applications and/or services. A network slice may be characterized by a type of use case, a type of application and/or service or the entity that provides the application and/or service via the network slice. However, any example in this description that characterizes a network slice in a specific manner is only provided for illustrative purposes. Throughout this description, reference to a network slice may represent any type of end-to-end logical network that is configured to serve a particular purpose and implemented on the 5G physical infrastructure.

The UE may be configured to perform any of a wide variety of different tasks. Thus, the UE may be configured to utilize one or more network slices. For example, the UE may utilize a first network slice for carrier services (e.g., voice, multimedia messaging service (MMS), Internet, etc.) and another network slice for a service provided by a third-party. To provide an example, the third-party may be the manufacturer of the UE that provides services such as, but not limited to, messaging, streaming multimedia, video calls, etc. In another example, the third-party may be an entity managing a digital platform (e.g., social media, e-commerce, streaming media, etc.). In a further example, the third-party may be an entity providing services for Internet of Things (IoT) devices.

A network slice may be identified by single network slice selection assistance information (S-NSSAI). Each S-NSSAI may be associated with a public land mobile network (PLMN) and may include the slice service type (SST) and a slice descriptor (SD). The SST may identify the expected behavior of the corresponding network slice with regard to services, features and characteristics. Those skilled in the art will understand that the SST may be associated with a standardized SST value. The SD may identify any one or more entities associated with the network slice. For example, the SD may indicate an owner or an entity that manages the network slice (e.g., carrier) and/or the entity that the is providing the application/service via the network slice (e.g., a third-party, the entity that provides the application or service, etc.). In some embodiments, the same entity may own the slice and provide the service (e.g., carrier services). Throughout this description, S-NSSAI refers to a single network slice and NSSAI may generally refer to one or more network slices.

As mentioned above, in a first aspect, the exemplary embodiments relate to storing network slice related information locally at the UE. The UE may be configured to maintain one or more databases that are configured to store NSSAI and other network slice related information associated with one or more PLMNs (e.g., home PLMN (HPLMN), visited PLMN (VPLMN), equivalent PLMN (ePLMN), etc.). During operation, the UE may experience a performance benefit when S-NSSAI associated with a PLMN is stored locally at the UE prior to the UE camping on the PLMN because if the UE already possesses the configured S-NSSAI for a camped PLMN the UE does not have to wait to be provisioned with the relevant S-NSSAI to access the corresponding network services. However, it is an inefficient use of UE resources to store NSSAI that the UE is unlikely to utilize. As will be demonstrated in detail below, the exemplary embodiments consider both the performance benefit of stored NSSAI and the amount of storage space utilized by NSSAI to ensure that an adequate user experience is maintained.

The exemplary embodiments are also described with regard to a PDU session. A PDU sessions generally refers to a logical connection between the UE and a data network within a network slice. The UE may be configured with multiple PDU sessions to one or more data networks simultaneously.

An application running on the UE may utilize a PDU session to receive network services associated with a S-NSSAI. During PDU session establishment for the S-NSSAI service, the UE may determine whether to initiate a new PDU session or utilize an existing PDU session. For example, at a first time, the UE may be configured with multiple existing PDU sessions. At a second time, an application running on the UE may trigger a PDU session establishment procedure while the one or more existing PDU sessions are still configured. During the PDU session establishment procedure, the UE may determine that the data flow for the application may be routed over one or more existing PDU sessions. Thus, the PDU session establishment procedure may include the UE determining whether to route traffic for the application to the data network over one of the existing PDU sessions or via a new PDU session.

As mentioned above, in a second aspect, the exemplary embodiments relate to PDU session establishment. There are various factors that the UE may consider when determining whether to use an existing PDU session for the S-NSSAI service or initiate a PDU session for the S-NSSAI service. These factors may include, but are not limited to, whether there is an existing PDU session for the requested S-NSSAI service, SST values, QoS parameters, availability of alternate QoS, the type of use case, a guaranteed bit rate, a non-guaranteed bit rate, etc. The exemplary embodiments relate to implementing a mechanism configured to select between an existing PDU session and initiating a PDU session for the S-NSSAI service to ensure an adequate user experience at the UE.

The exemplary embodiments are also described with regard to utilizing non-3GPP access technology to access a network slice. Those skilled in the art will understand that non-3GPP access relates to the UE accessing the core network using an access technology that is not specified in 3GPP standards. Throughout this description, non-3GPP access will be described as being facilitated by a wireless local area network (WLAN). However, reference to WLAN is merely provided for illustrative purposes, those skilled in the art will understand that scope of the term "non-3GPP access."

As mentioned above, in a third aspect, the exemplary embodiments relate to utilizing a non-3GPP access technology to access a network slice while roaming. Non-3GPP access may allow the UE to access a network slice that may be not available in a roaming country. Specific examples of each of these exemplary aspects will be described in more detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, eMTC devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are 5G New Radio (NR) radio access networks (5G NR-RAN) 120 and a WLAN 122. However, it should be understood that the UE 110 may also communicate with other types of networks (e.g. LTE network, legacy cellular network, etc.) and the UE 110 may also communicate with networks over a wired connection. With regard to the exemplary embodiments, the UE 110 may establish a connection with the 5G NR-RAN 120 or the WLAN 122.

The 5G NR-RAN 120 may be a portion of a cellular network that may be deployed by cellular providers (e.g., Verizon, AT&T, Sprint, T-Mobile, etc.). The network 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In this example, the UE 110 may connect to the 5G NR-RAN 120 via the next generation Node B (gNB) 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5g NR-RAN 120).

The WLAN 122 may include any type of wireless local area network (WiFi, Hot Spot, IEEE 802.11x networks, etc.). However, as mentioned above, reference to a WLAN 122 is merely provided for illustrative purposes and the WLAN 122 may represent any appropriate type of non-3GPP access network. Thus, the WLAN 122 may be configured to access the cellular core network 130.

The UE 110 may connect to the WLAN 122 via access point (AP 122A). Those skilled in the art will understand that any association procedure may be performed for the UE 110 to connect to the WLAN 122. For example, upon detecting the presence of the WLAN 122, the UE 110 may transmit credential information to associate with the WLAN 122. More specifically, the UE 110 may associate with an AP (e.g., the AP 122A.)

The network arrangement 100 also includes a cellular core network 130, the Internet 140, an IP Multimedia Subsystem (IMS) 150, and a network services backbone 160. The cellular core network 130 may be considered to be the interconnected set of components that manages the operation/traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
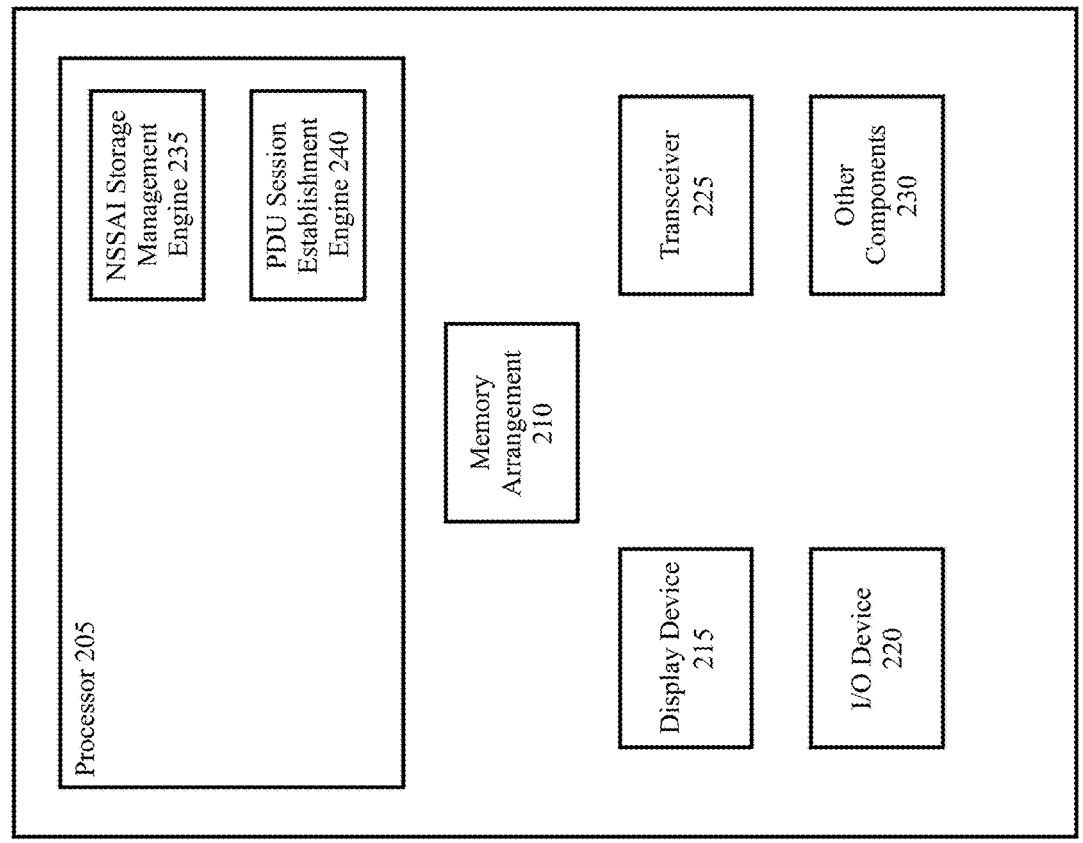
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 110 to other electronic devices, sensors to detect conditions of the UE 110, etc.

The processor 205 may be configured to execute a plurality of engines for the UE 110. For example, the engines may include a NSSAI storage management engine 235 and a PDU session establishment engine 240. The NSSAI storage management engine 235 may perform various operations related to maintaining a database stored locally at the UE 110 that is configured to include network slice related information associated with a PLMN that may be used to access particular network services. The PDU session establishment engine 240 may perform various operations related to determining whether route application traffic over an existing PDU session, a new PDU session and/or over a non-3GPP access network (e.g., WLAN 122).

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor.

The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and the WLAN 122. Accordingly, the transceiver 225 may operate on a variety of different frequencies or channels (e.g., set of consecutive frequencies).

As mentioned above, in a first aspect, the exemplary embodiments relate to storing network slice related information locally at the UE. The UE may be configured to maintain one or more databases that are configured to store NSSAI and other network slice related information associated with one or more PLMNs. On one hand storing the S-NSSAI (and other network slice related information) so that it is available to the UE 110 when the UE 110 initially camps on the PLMN provides a performance benefit because the UE 110 is able to quickly access the corresponding network services. On the other hand, storing information that is unlikely to be used by the UE 110 is an inefficient use of memory resources. The method 300 described below provides a mechanism that is configured to balance the performance benefit with the resource utilization.

Figure 3:
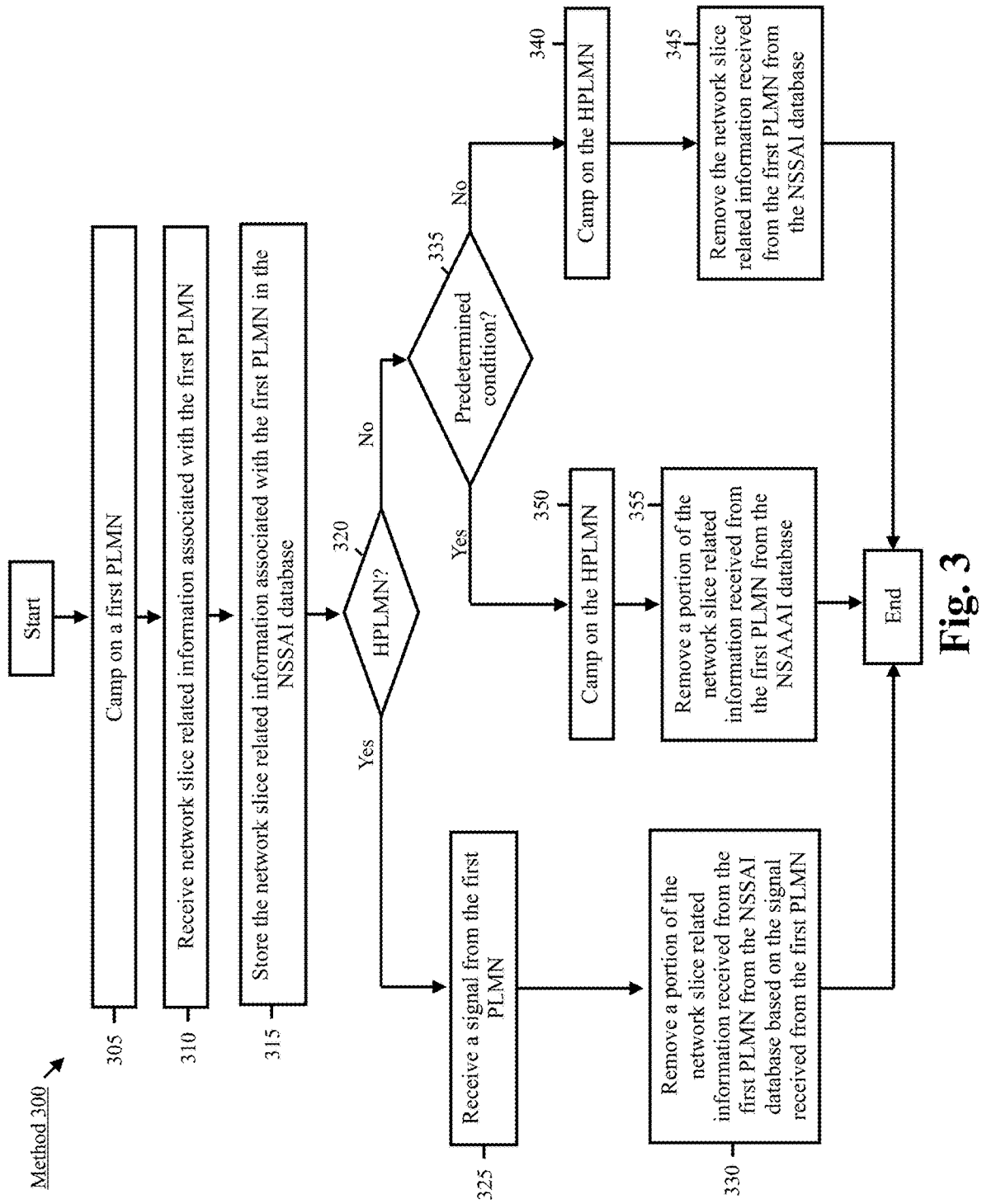
FIG. 3 shows a method for maintaining a database of network slice selection assistance information (NSSAI) stored locally at the UE according to various exemplary embodiments.

FIG. 3 shows a method 300 for maintaining a NSSAI database stored locally at the UE 110 according to various exemplary embodiments. The method 300 will be described with regard to the network arrangement 100 of FIG. 1 and the UE 110 of FIG. 2.

In 305, the UE 110 camps on a first PLMN. As will be demonstrated below, the exemplary embodiments are not limited to any particular type of PLMN and thus, the first PLMN may represent any type of PLMN (e.g., home PLMN (HPLMN), equivalent PLMN (ePLMN), visited PLMN, etc.).

In 310, the UE 110 receives network slice related information associated with the first PLMN. In this example, the UE 110 is provisioned with this network slice related information during a network registration procedure. For instance, when the UE 110 registers with a PLMN and/or a registration area, the UE 110 may be provisioned with a list of S-NSSAI (and other network slice related information) that are configured for the associated PLMN. This list of S-NSSAI could be received as part of registration procedure in any of the following IE: Allowed S-NSSAI or Configured S-NSSAI or Subscribed S-NSSAI. However, the exemplary embodiments are not limited to the UE 110 being provisioned with the network slice related information during a registration procedure and may apply to the UE 110 receiving network slice related information at any appropriate time.

As mentioned above, the network slice related information may include a set of S-NSSAI that are configured for the first PLMN. In some embodiments, the carrier associated with the first PLMN and the UE 110 may not utilize common S-NSSAI parameter values. In this type of scenario, the network slice related information may include a mapping of the configured S-NSSAI of the first PLMN to the S-NSSAI of the UE 110 HPLMN. This may ensure that the UE 110 understands the relevant parameters for the S-NSSAI associated with the first PLMN.

In 315, the UE 110 stores the network slice related information received from the first PLMN in the NSSAI database. The UE 110 may utilize this information to access network slices while camped on the first PLMN. Although not shown in the method 300, there may be a scenario in which the UE 110 is already equipped with network slice related information provided by the first PLMN. In this type of scenario, the UE 110 may not store redundant information.

In 320, the UE 110 determines whether the first PLMN is the HPLMN of the UE 110. If the first PLMN is the HPLMN of the UE 110, the method 300 continues to 325. Since the first PLMN is the HPLMN, the UE 110 may configure the network slice related information to remain stored in the database even after a power cycle, e.g., in non-volatile memory. This ensures that the UE 110 has access to the S-NSSAI associated with the HPLMN which is likely the PLMN the UE 110 is most frequently camped on. In this scenario, the performance benefit of being able to quickly access network services when camped on the HPLMN is an efficient use of the memory resources storing this information.

In 325, the UE 110 receives a signal from the first PLMN (e.g., HPLMN). The signal may indicate to the UE 110 that certain S-NSSAI (or other network slice related information) stored at the UE 110 should be removed from the NSSAI database. For example, there may be a change in the network slice configuration on the network side. The HPLMN may signal this indication to the UEs associated with the HPLMN to ensure that the UEs are not wasting resources storing obsolete information. In 330, the UE 110 removes a portion of the network slice related information received from the first PLMN based on the signal received from the first PLMN. Subsequently, the method 300 ends.

Returning to 320, if the first PLMN is not the HPLMN, the method 300 continues to 335. In 335, the UE 110 determines whether a predetermined condition associated with the first PLMN is satisfied. The predetermined condition may relate to whether the first PLMN is likely to be utilized by the UE 110 after the UE 110 moves away from the currently camped first PLMN.

One exemplary predetermined condition relates to whether the first PLMN is frequency visited by the UE 110. The UE 110 may consider the first PLMN a frequently visited PLMN if the UE 110 has camped on the first PLMN a predetermined number of times within a predetermined duration. Another exemplary predetermined condition is the geographical location of the first PLMN relative to the HPLMN of the UE 110. For example, if the first PLMN is within a predetermined distance relative to the HPLMN of the UE 110 (e.g., borders the HPLMN, etc.), it may be considered likely that the UE 110 may interact with the first PLMN several times during the lifespan of the UE 110.

If the predetermined condition associated with the first PLMN is not satisfied, the method 300 continues to 340. In 340, the UE 110 camps on the HPLMN. For example, the UE 110 may be moved from the coverage area of the first PLMN to the coverage area of the HPLMN.

In 345, the UE 110 removes the network slice related information received from the first PLMN from the NSSAI database. The absence of the predetermined condition indicates that the UE 110 is unlikely to return to the first PLMN at a later time. Thus, when the UE 110 returns to the HPLMN, the UE 110 removes the network slice information associated with the first PLMN from the NSSAI database. As mentioned above, it would be an inefficient use of UE 110 resources to utilize storage space for a PLMN that the UE 110 is unlikely to camp on.

Returning to 335, if the predetermined condition associated with the first PLMN is satisfied, the method continues to 350.

In 350, the UE 110 camps on the HPLMN. In 355, the UE 110 removes a portion of the network slice related information received from the first PLMN from the NSAAI database. For example, the UE 110 may retain a predetermined type of network slice related information to ensure that certain services are easily accessible if the UE 110 returns to the first PLMN. The predetermined type of network slice related information may relate to information associated with a third party (e.g., the manufacturer, service provider, etc.), information associated with a particular service, information associated with an application that is frequently used by the UE 110, etc. The UE 110 may remove the remaining network slice related information associated with the first PLMN to free up memory resources. However, the exemplary embodiments are not limited to the UE 110 retaining any amount or type of network slice related information received from the first PLMN. The UE 110 may decide to retain any or all of the network slice related information associated with the first PLMN for any appropriate reason. Subsequently, the method 300 ends.

As mentioned above, in a second aspect, the exemplary embodiments relate to PDU session establishment. As will be demonstrated below in FIGS. 4-8 there are various factors for the UE 110 to consider when deciding how to route application traffic to a data network during a PDU session establishment procedure.

Figure 4:
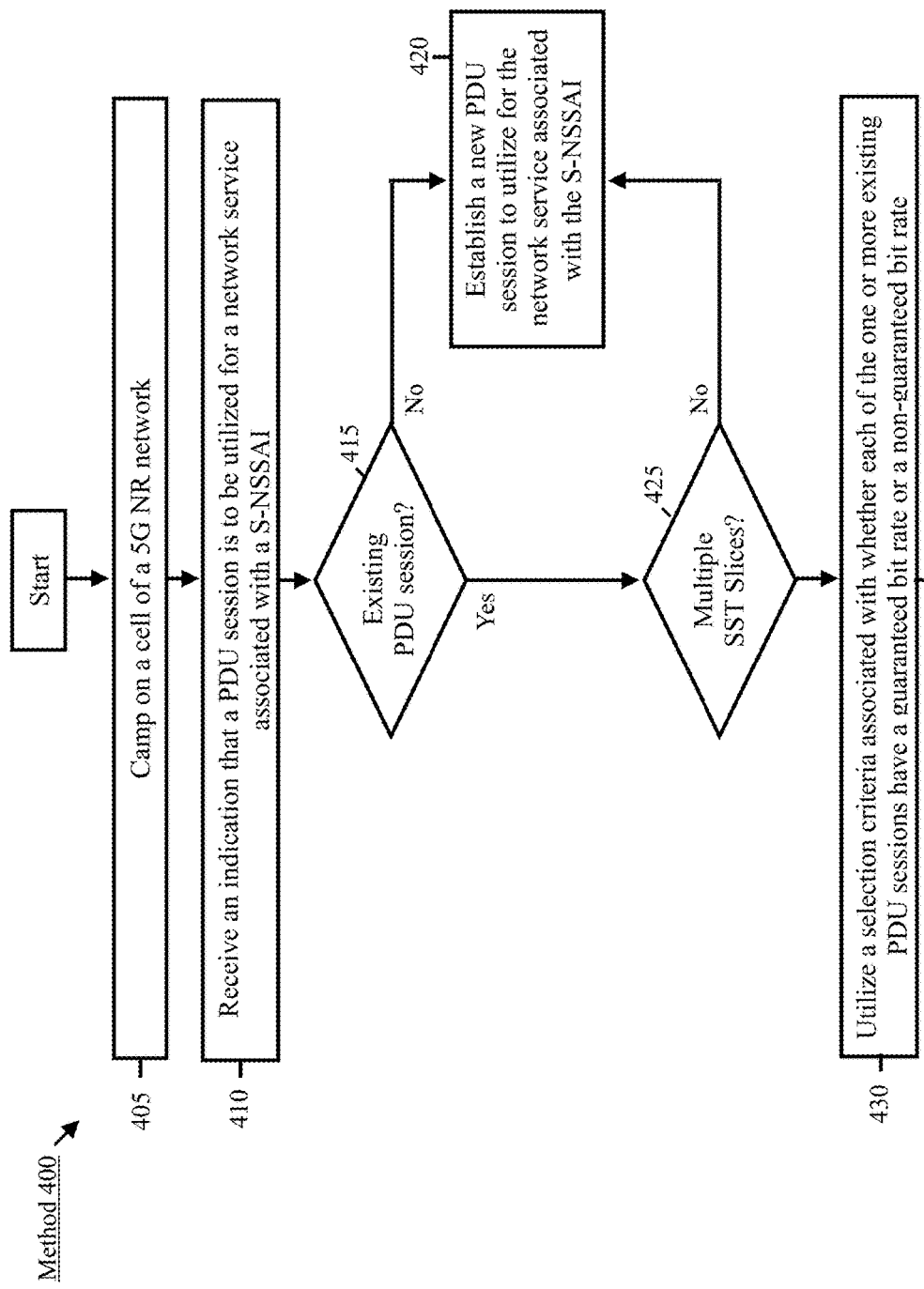
FIG. 4 shows a method for protocol data unit (PDU) session establishment according to various exemplary embodiments.

FIG. 4 shows a method 400 for PDU session establishment according to various exemplary embodiments. The method 400 will be described with regard to the network arrangement 100 of FIG. 1 and the UE 110 of FIG. 2.

In 405, the UE 110 camps on a cell of a 5G NR network. For example, the UE 110 may camp on the gNB 120A.

In 410, the UE 110 receives an indication that a PDU session is to be utilized for a network service associated with a S-NSSAI. For example, an application running on the UE 110 may be launched. The application may be configured to receive a network service associated with a particular network slice (e.g., S-NSSAI). A PDU session may be utilized to connect the UE 110 and a data network within a network slice. Thus, the PDU session may facilitate the exchange of data that allows the UE 110 to receive the network service.

In 415, the UE 110 determines whether at least one existing PDU session may be utilized for the network service associated with the S-NSSAI. The UE 110 may maintain multiple PDU sessions simultaneously. Thus, when the application is launched the UE 110 may have already established one or more PDU sessions. If an existing PDU sessions is capable of routing the traffic for the network service associated with the S-NSSAI, the UE 110 may decide to utilize the existing PDU session for the network service associated with the S-NSSAI. The UE 110 may make this determination based on UE route selection policy (URSP). How the UE 110 utilizes the URSP rules to make this determination is beyond the scope of the exemplary embodiments. Instead, as will be demonstrated below, the exemplary embodiments relate to determine whether to utilize an existing PDU session or initiate a new PDU session for the network service associated with the S-NSSAI.

If the UE 110 identifies that an existing PDU session may not be utilized for the network service associated with the S-NSSAI, the method 400 continues to 420. In 420, the UE 110 establishes a new PDU session to utilize for the network service associated with the S-NSSAI. For example, the UE 110 may transmit a PDU session establishment request to the gNB 120A that indicates that the UE 110 would like to utilize a new PDU session to receive the network service associated with the S-NSSAI. Subsequently, various signaling may occur between various network functions and components. The UE 110 may then receive a PDU session establishment accept message from the network indicating that the PDU session has been established. Subsequently, the method 400 ends.

If the UE 110 identifies that an existing PDU session may be utilized for the network service associated with the S-NSSAI, the method 400 continues to 425. In 425, the UE 110 determines whether there are multiple SST slices capable of supporting the network service associated with the S-NSSAI. For example, consider a scenario in which the application running on the UE 110 is a gaming application. This application may be able to utilize an SST slice associated with gaming and an SST slice associated with third party services. If both of these types of SST slices are support by the currently camped PLMN, the UE 110 may utilize either of these SST slices for the network service associated with the S-NSSAI. The UE 110 may make this determination based on information stored locally at the UE 110 (e.g., the NSSAI database) and/or information provided to the UE 110 via network signaling.

FIG. 5 shows a table 500 that illustrates an exemplary set of SST slices. This table is not intended to limit the exemplary embodiments in any way and is merely intended to provide an example of different types of SST slices. The table 500 includes a slice/service type column 505, an SST value column 510 and a characteristic column 515. The slice/service type column 505 identifies a network slice that is available on the currently camped PLMN. The SST value column 510 identifies an SST value associated with a network slice. The characteristic column 515 describes the network characteristics and/or services that may be provided by the corresponding network slice.

Continuing with scenario considered above, if the application running on the UE 110 is for gaming, the application may utilize a PDU session within either third party services slice identified by the SST value 7 or the gaming slice identified by the SST value 8. Thus, despite having different network characteristics (e.g., non-guaranteed bit rate, guaranteed bit rate), multiple SST slices may be utilized for a network service associated with a S-NSSAI.

Returning to 425 of the method 400, if the UE 110 determines there is only a single SST slice capable of supporting the network service associated with the S-NSAI, the method 400 continues to 420. As mentioned above, in 420, the UE 110 establishes a new PDU session to utilize for the network service associated with the S-NSSAI. Subsequently, the method 400 ends.

Returning to 425 of the method 400, if the UE 110 determines there are multiple SST slices capable of supporting the network service associated with the S-NSSAI, the method 400 continues to 430. At this time, the UE 110 has identified i) at least one existing PDU session that may be utilized for the network service associated with the S-NSSAI and ii) multiple SST slices capable of supporting the network service associated with the S-NSSAI.

Figure 6:
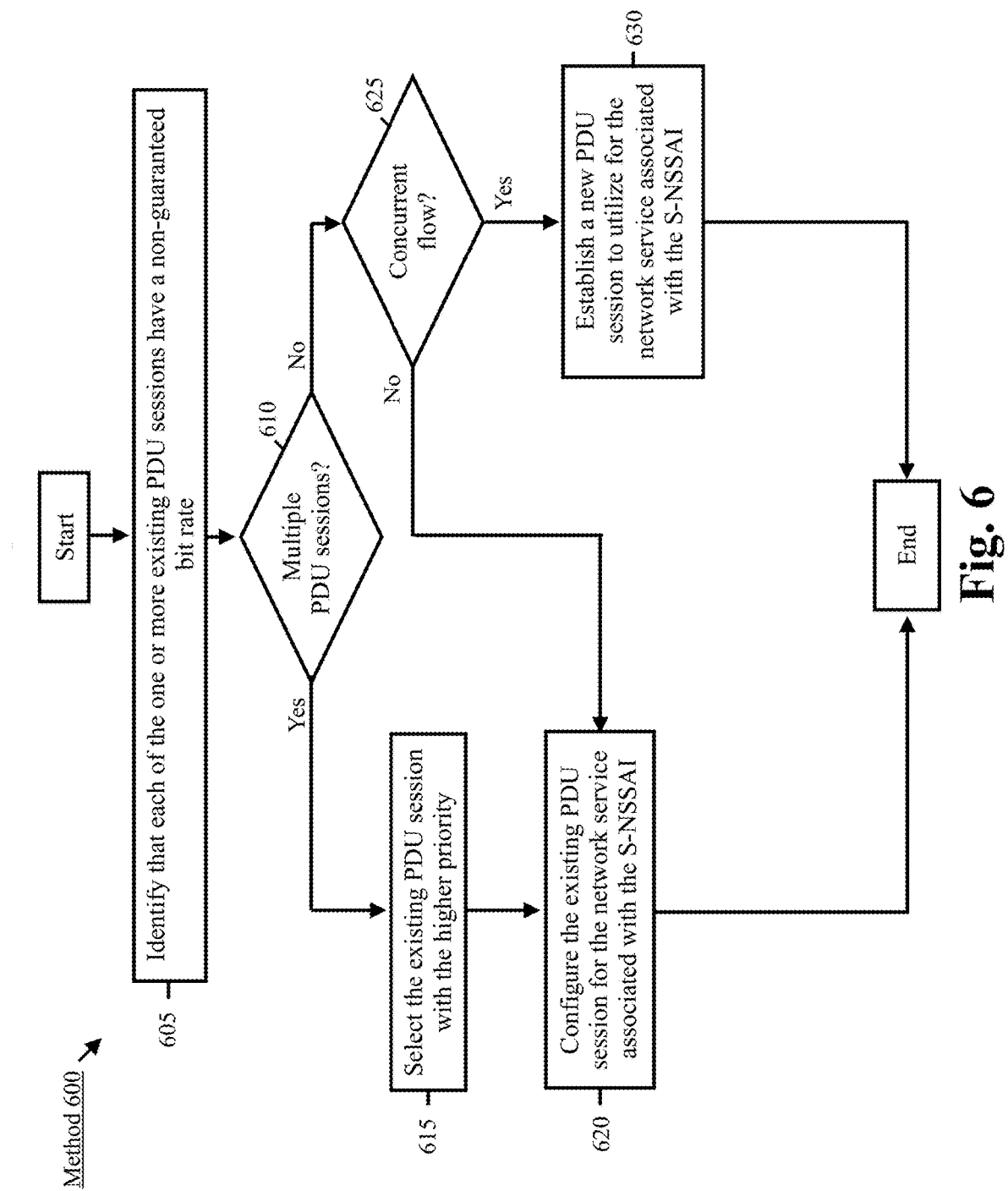
FIG. 6 shows a method for PDU session establishment with regard to a scenario in which each of the one or more existing PDU sessions include a non-guaranteed bit rate.
Figure 7:
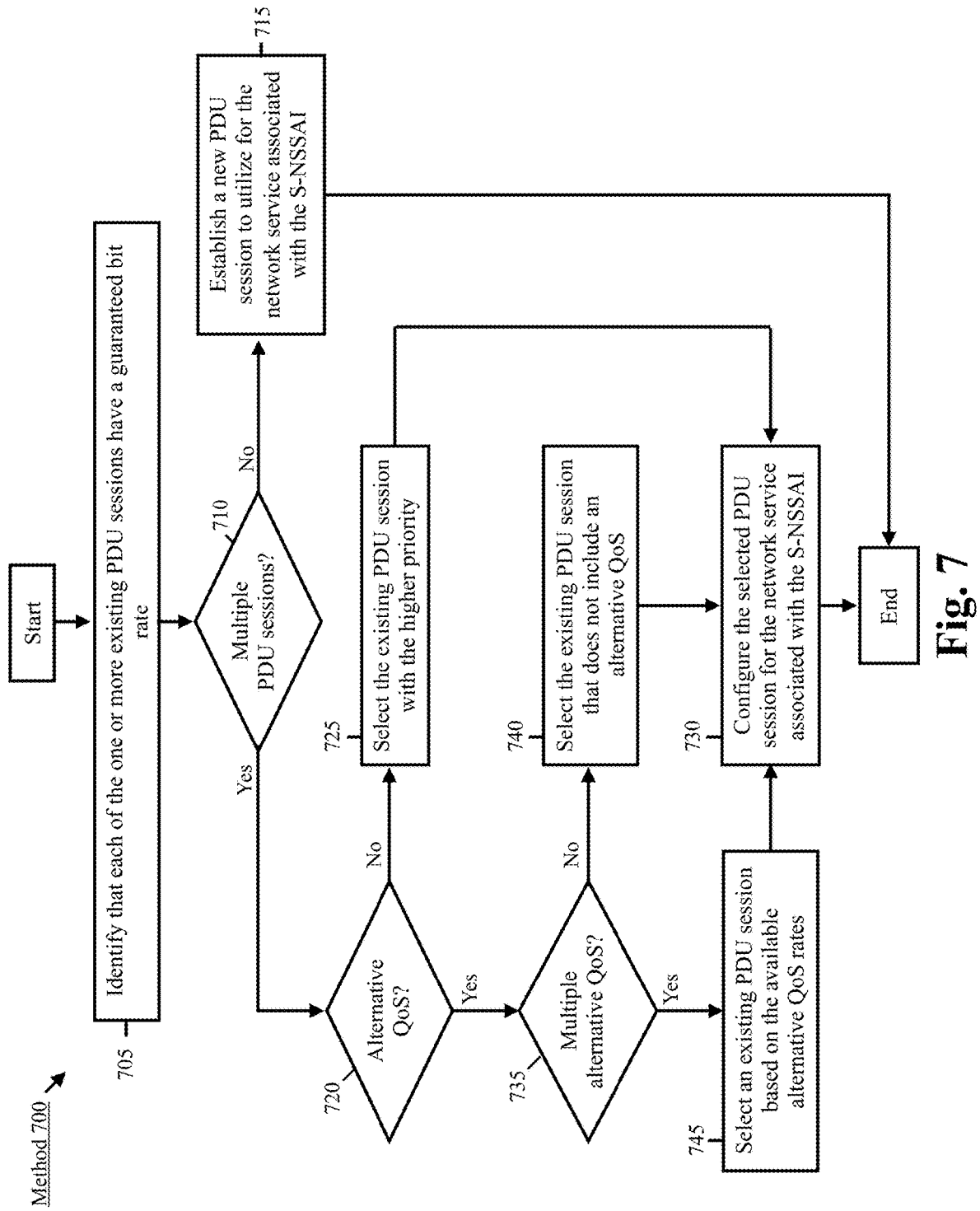
FIG. 7 shows a method for PDU session establishment with regard to a scenario in which each of the one or more existing PDU sessions include a guaranteed bit rate.
Figure 8:
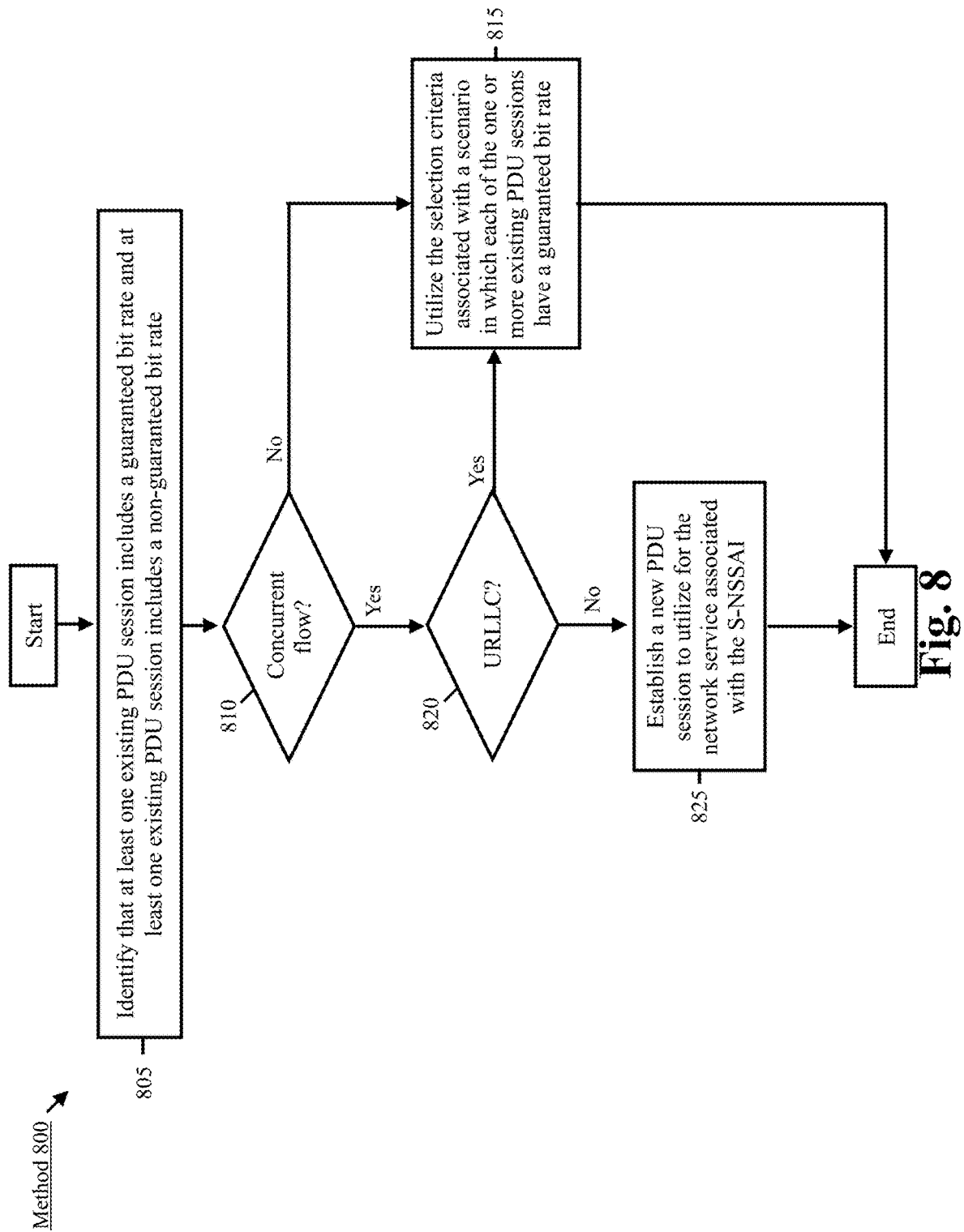
FIG. 8 shows a method for PDU session establishment with regard to a scenario in which at least one existing PDU session includes a guaranteed bit rate and at least one existing PDU session includes a non-guaranteed bit rate.

In 430, the UE 110 utilizes selection criteria associated with whether each of the one or more existing PDU sessions have a guaranteed bit rate or a non-guaranteed bit rate. The UE 110 may utilize this selection criteria to determine whether to utilize an existing PDU session or initiate a new PDU session for the network service associated with the S-NSSAI. FIG. 6 will show a method 600 related to utilizing selection criteria associated with a scenario in which each of the one or more existing PDU sessions have a non-guaranteed bit rate. FIG. 7 will show a method 700 related to utilizing selection criteria associated with a scenario in which each of the one or more existing PDU sessions have a guaranteed bit rate. FIG. 8 will show a method 800 related to utilizing selection criteria associated with a scenario in which at least one existing PDU session has a non-guaranteed bit rate and at least one existing PDU session has a guaranteed bit rate.

FIG. 6 shows a method 600 for PDU session establishment with regard to a scenario in which each of the one or more existing PDU sessions include a non-guaranteed bit rate.

The method 600 occurs after 430 of the method 400. At this time, the UE 110 has identified i) at least one existing PDU session that may be utilized for the network service associated with the S-NSSAI and ii) multiple SST slices capable of supporting the network service associated with the S-NSSAI.

In 605, the UE 110 identifies that each of one or more existing PDU sessions has a non-guaranteed bit rate.

In 610, it is considered whether there are multiple existing PDU sessions that may be used for the network service associated with the S-NSSAI. From the perspective of the UE 110, the presence of multiple existing PDU sessions that may be used for the network service associated with the S-NSSAI may be identified during the operations performed in the method 400. It is considered here in 610 to demonstrate the difference in selection criteria when there is one existing PDU session with a non-guaranteed bit rate and multiple existing PDU sessions with a non-guaranteed bit rate.

If there are multiple existing PDU sessions that may be used for the network service associated with the S-NSSAI, the method 600 continues to 615. In 615, the UE 110 selects the existing PDU session with the higher priority to use for the network service associated with the S-NSSAI. For example, each of the existing PDU sessions may include a priority parameter related to allocation and retention. The priority parameter indicates whether the QoS flow can preempt another QoS flow or be preempted by another QoS flow. Thus, the UE 110 may select the existing PDU session that is least likely to be preempted by another data flow.

In 620, the UE 110 configures the existing PDU session for the network service associated with the S-NSSAI. For example, the UE 110 may transmit a PDU session modification request to the gNB 120A that indicates that the UE 110 would like to utilize an existing PDU session for the network service associated with the S-NSSAI. Subsequently, various signaling may occur between various network functions and components. The UE 110 may then receive a PDU session modification command message from the network indicated that the existing PDU session may be utilized. Subsequently, the method 600 ends.

Returning to 610, if there is a single existing PDU session that may be used for the network service associated with the S-NSSAI, the method 600 continues to 625. In 625, the UE 110 determines whether there would be a concurrent data flow on one of the multiple available SST slices. This may be the existing PDU session identified in the methods 400 and 600 or a PDU session being utilized for a different service.

If there is not another concurrent data flow, the method 600 continues to 620 where the UE 110 configures the existing PDU session for the network service associated with the S-NSSAI. If there is another concurrent existing data flow, the method 600 continues to 630. In 630, the UE 110 establishes a new PDU session to utilize for the network service associated with the S-NSSAI. The new PDU session may use the SST slice that is not being used for an ongoing service. For example, consider the table 500. At a first time, there may be an application running on the UE 110 that utilizes a network service associated with SST slice 7. At a second time, the UE 110 may launch a gaming application. As shown in the table 500, the gaming application relates to a service that is capable of utilizing either SST slice 7 or SST slice 8. In this scenario, the UE 110 in 625 would initiate the PDU session over SST slice 8 because it is not being utilized for an ongoing service.

FIG. 7 shows a method 700 for PDU session establishment with regard to a scenario in which each of the one or more existing PDU sessions include a guaranteed bit rate.

The method 700 occurs after 430 of the method 400. At this time, the UE 110 has identified i) at least one existing PDU session that may be utilized for the network service associated with the S-NSSAI and ii) multiple SST slices capable of supporting the network service associated with the S-NSSAI.

In 705, the UE 110 identifies that each of one or more existing PDU sessions has a guaranteed bit rate.

In 710, it is considered whether there are multiple existing PDU sessions that may be used for the network service associated with the S-NSSAI. From the perspective of the UE 110, the presence of multiple existing PDU sessions that may be used for the network service associated with the S-NSSAI may be identified during the operations performed in the method 400. It is considered here in 710 to demonstrate the difference in selection criteria when there is one existing PDU session with a guaranteed bit rate and multiple existing PDU sessions with a guaranteed bit rate.

If there is a single existing PDU session with a guaranteed bit rate, the method 700 continues to 715. In 715, the UE 110 establishes a new PDU session to utilize for the network service associated with the S-NSSAI. The new PDU session may use the SST slice that is not being used for an ongoing service. For example, if a first SST slice and a second SST slice are capable of supporting the network service associated with the S-NSSAI and the existing PDU session is using the first SST slice, the new PDU session will be configured with the second SST slice.

Returning to 710, if there are multiple existing PDU sessions with a guaranteed bit rate, the method 700 continues to 720. In 720, the UE 110 determines whether any of the existing PDU sessions include an alternative QoS. An alternative QoS may generally refer to a set of QoS parameters to which the application traffic may adapt to. For example, the application may request different QoS levels from the network and the network may facilitate one of QoS levels based on available resources. Alternative QoS provides flexibility for the UE 110 and the network.

If none of the existing PDU sessions include an alternative QoS, the method 700 continues to 725. In 725, the UE 110 selects the existing PDU session with the higher priority to use for the network service associated with the S-NSSAI. As mentioned above, the priority relates to preemption and thus, the UE 110 may select the existing PDU session that is least likely to be preempted by another data flow.

In 730, the UE 110 configures the selected PDU session for the network service associated with the S-NSSAI. For example, the UE 110 may transmit a PDU session modification request to the gNB 120A that indicates that the UE 110 would like to utilize an existing PDU session for the network service associated with the S-NSSAI. Subsequently, various signaling may occur between various network functions and components. The UE 110 may then receive a PDU session modification command message from the network indicated that the existing PDU session may be utilized. Subsequently, the method 700 ends.

If at least one of the existing PDU sessions include an alternative QoS, the method 700 continues to 735. In 735, the UE 110 determines whether there is more than one existing PDU session with an alternative QoS. If there is only a single PDU session with alternative QoS, the method 700 continues to 740. In 740, the UE 110 selects the existing PDU session that does not include alternative QoS to use for the network service associated with the S-NSSAI. Subsequently, the method 700 continues to 730 where the UE 110 configures the existing PDU session for the network service associated with the s-NSSAI.

If there are multiple existing PDU sessions with an alternative QoS, the method 700 continues to 745. In 745, the UE 110 selects an existing PDU session based on the available alternative QoS rates. For example, the alternative QoS for a first existing PDU session may have a rate that is higher than the alternative QoS for a second existing PDU session. Thus, in this example, the UE 110 may compare the alternative QoS rates and select the PDU session with the higher QoS rate. However, the exemplary embodiments are not limited to selecting between PDU sessions with alternative QoS rates based on a higher rate and may apply to any appropriate basis being utilized. Subsequently, the method 700 continues to 730 where the UE 110 configures the existing PDU session for the network service associated with the s-NSSAI. Subsequently, the method 700 ends.

FIG. 8 shows a method 800 for PDU session establishment with regard to a scenario in which at least one existing PDU session includes a guaranteed bit rate and at least one existing PDU session includes a non-guaranteed bit rate.

The method 800 occurs after 430 of the method 400. At this time, the UE 110 has identified i) at least two existing PDU sessions that may be utilized for the network service associated with the S-NSSAI and ii) multiple SST slices capable of supporting the network service associated with the S-NSSAI.

In 805, the UE 110 identifies that at least one existing PDU session include a guaranteed bit rate and at least one existing PDU session includes a non-guaranteed bit rate.

In 810, the UE 110 determines whether there would be a concurrent data flow on one of the multiple available SST slices. If there is not another concurrent data flow, the method 800 continues to 815.

In 815, the UE 110 utilizes the selection criteria associated with a scenario in which each of the one or more existing PDU sessions have a guaranteed bit rate. This selection criteria is demonstrated in the method 700 of FIG. 7. In other words, under these circumstances, the UE 110 may ignore the available PDU session with the non-guaranteed bit rate and apply the method 700 to determine whether to select one of the at least one existing PDU sessions with the guaranteed bit rate for the network service associated with the N-SSAI or to initiate a new PDU session for the network service associated with the N-SSAI.

Returning to 810, if there is a concurrent data flow, the method 800 continues to 820. In 820, the UE 110 determines whether the network service associated with the S-NSSAI is for URLLC. If the network service associated with the S-NSSAI is for URLLC, the method 800 continues to 815.

If the network service associated with the S-NSSAI is not for URLLC, the method 800 continues to 825.

In 825, the UE 110 establishes a new PDU session to utilize for the network service associated with the S-NSSAI. The new PDU session may use the SST slice that is not being used for an ongoing service. Subsequently, the method 800 ends.

As mentioned above, in a third aspect, the exemplary embodiments relate to the UE utilizing non-3GPP access technology to access a network slice while roaming.

Figure 9:
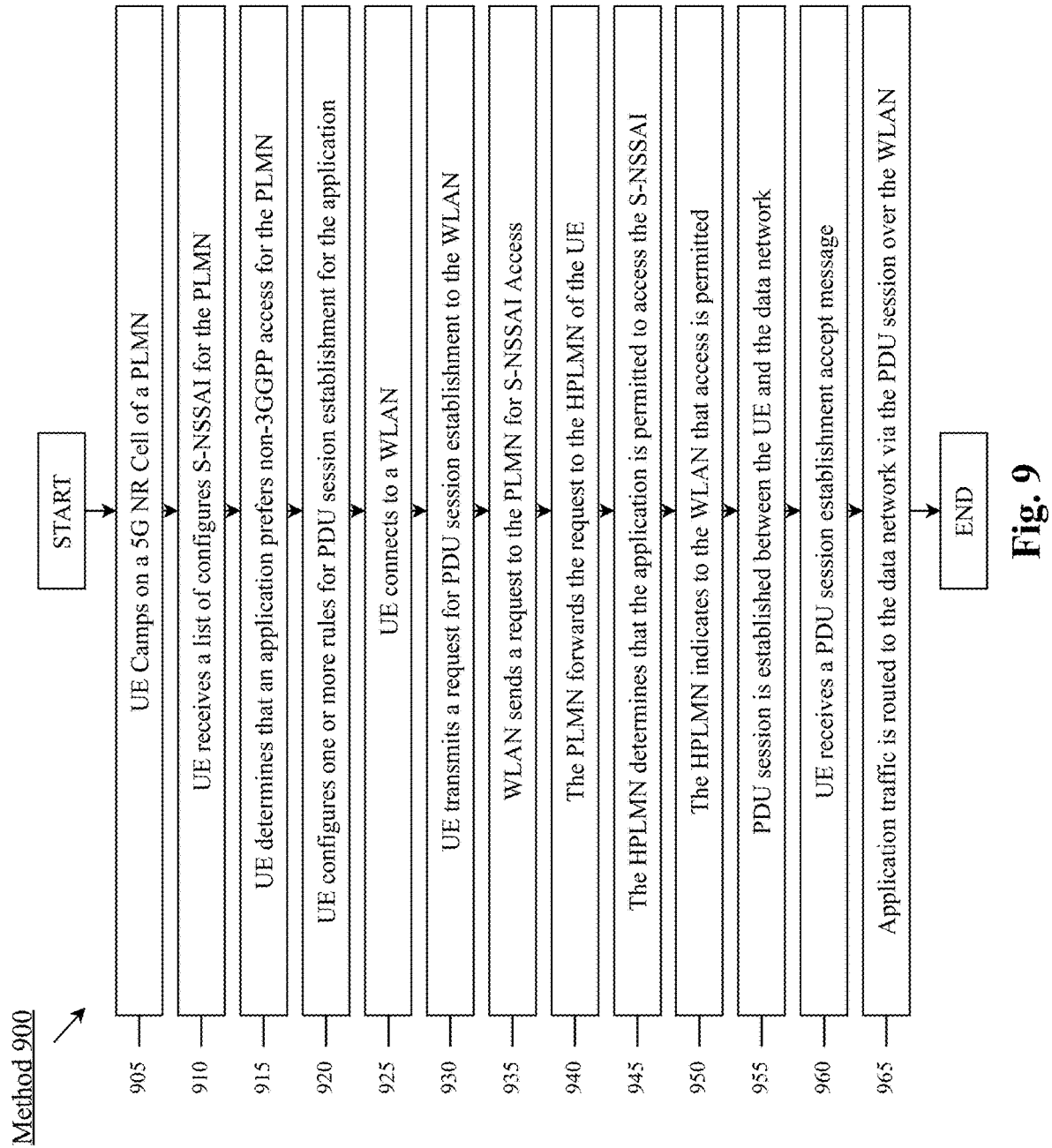
FIG. 9 shows a method for utilizing non-third generation partnership project (3GPP) access technology to access a S-NSSAI according to various exemplary embodiments.

FIG. 9 shows a method 900 for utilizing non-3GPP access technology to access a S-NSSAI according to various exemplary embodiments.

In 905, the UE 110 may camp on a 5G NR cell of a PLMN. For example, the UE 110 may camp on the gNB 120A.

In 910, the UE 110 receives a list of configured S-NSSAI for the currently camped PLMN. For example, during network registration, the network may provision the UE 110 with a set of S-NSSAI that are configured to be utilized within the currently camped PLMN. In some embodiments, the list of S-NSSAI could be received as part of Allowed NSSAI or Subscribed NSSAI. In this example, the currently camped PLMN is not the HPLMN of the UE 110.

In 915, the UE 110 determines that an application of the UE 110 prefers non-3GPP access for the currently camped PLMN. As will be explained below, the UE 110 may modify its expected behavior to comply with the application's preference.

In 920, the UE 110 configures one or more rules for PDU session establishment associated with the application. In this example, the one or more rules may include initiating a PDU session for this application only when connection to a non-3GPP access network. However, the exemplary embodiments are not limited to this rule and may apply to any appropriate rule that may allow facilitate an application's preference for non-3GPP access within a PLMN.

In 925, the UE 110 connects to a WLAN. For example, the UE 110 may connect to the WLAN 122 via the AP 122A. The connection to the WLAN may exist simultaneously with a connection to a 3GPP access network or the connection to the WLAN may exist when there is no 3GPP connection.

In 930, the UE 110 transmits a request for PDU session establishment to the WLAN 122. The request may indicate to the WLAN 122 that the application running on the UE 110 wants to use a network service associated with a S-NSSAI. Thus, in accordance with the rules configured in 920, the UE 110 initiates PDU session establishment for the application while connected to the WLAN 122.

As will be shown below with regard to 935-955 various operations may be performed between various networks to establish the PDU session over the non-3GPP access network. In 935, the WLAN sends a request to the PLMN for the S-NSSAI access. In 940, the PLMN forwards the request to the HPLMN of the UE 110. In 945, the HPLMN of the UE 110 determines that the application running on the UE 110 is permitted to access the S-NSSAI. In 950, the HPLMN of the UE 110 indicates to the WLAN 122 that the UE 110 is permitted to access S-NSSAI. The HPLMN may provide this indication to the WLAN 122 indirectly via the PLMN. In 955, the PDU session is established between the UE 110 and the corresponding data network.

In 960, the UE 110 receives a PDU session establishment accept message from the WLAN 122. In 965, the application traffic is routed to the data network via the PDU session over the WLAN 122. Subsequently, the method 900 ends.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    receiving network slice related information associated with a first public land mobile network (PLMN);
    storing the network slice related information in a database locally at the UE;
    determining whether the first PLMN is a home PLMN (HPLMN) of the UE;
    when the first PLMN is not the HPLMN of the UE, identifying a predetermined condition; and
    removing at least a portion of the network slice information associated with the first PLMN from the database based on the predetermined condition.

2. The processor of claim 1, wherein the predetermined condition corresponds to a signal transmitted to the UE by the first PLMN.

3. The processor of claim 2, wherein
    the signal comprises an identification of the at least the portion of the network slice information that is to be removed from the database.

4. The processor of claim 1, wherein the predetermined condition corresponds to whether the UE camps on the first PLMN a predetermined number of times within a predetermined duration.

5. The processor of claim 1, wherein
    the predetermined condition is related to a visited PLMN (VPLMN) and the removing is further based on the UE camping on a second PLMN.

6. The processor of claim 5, wherein the predetermined condition corresponds to a geographical location of the first PLMN.

7. The processor of claim 5, wherein the predetermined condition comprises a satisfied state or a non-satisfied state, wherein when the predetermined condition is in the non-satisfied state, the at least the portion of the network slice information associated with the first PLMN comprises all the network slice information associated with the first PLMN.

8. A user equipment (UE), comprising:
    a memory;
    a transceiver configured to communicate with one or more public land mobile networks (PLMNs); and
    a processor configured to:
        receive network slice related information associated with a first PLMN;
        store the network slice related information in the memory;
        determine whether the first PLMN is a home PLMN (HPLMN) of the UE;
        when the first PLMN is not the HPLMN of the UE, identify a predetermined condition; and
        remove at least a portion of the network slice information associated with the first PLMN from the memory based on the predetermined condition.

9. The UE of claim 8, wherein the predetermined condition corresponds to a signal transmitted to the UE by the first PLMN.

10. The UE of claim 9, wherein the signal comprises an identification of the at least the portion of the network slice information that is to be removed from the memory.

11. The UE of claim 8, wherein
    the predetermined condition is related to a visited PLMN (VPLMN) and the removing is further based on the UE camping on a second PLMN.

12. The UE of claim 11, wherein the predetermined condition corresponds to whether the UE camps on the first PLMN a predetermined number of times within a predetermined duration.

13. The UE of claim 11, wherein the predetermined condition corresponds to a geographical location of the first PLMN.

14. The UE of claim 11, wherein the predetermined condition comprises a satisfied state or a non-satisfied state, wherein when the predetermined condition is in the non-satisfied state, the at least the portion of the network slice information associated with the first PLMN comprises all the network slice information associated with the first PLMN.

15. A non-transitory computer readable memory storing a set of instructions that when executed causes a processor of a user equipment (UE) to:
    receive network slice related information associated with a first public land mobile network (PLMN);
    store the network slice related information in a database locally at the UE;
    determine whether the first PLMN is a home PLMN (HPLMN) of the UE;
    when the first PLMN is not the HPLMN of the UE, identify a predetermined condition; and
    remove at least a portion of the network slice information associated with the first PLMN from the database based on the predetermined condition.

16. The non-transitory computer readable memory of claim 15, wherein the predetermined condition corresponds to a signal transmitted to the UE by the first PLMN.

17. The non-transitory computer readable memory of claim 16, wherein the signal comprises an identification of the at least the portion of the network slice information that is to be removed from the database.

18. The non-transitory computer readable memory of claim 15, wherein
the predetermined condition is related to a visited PLMN (VPLMN) and the removing is further based on the UE camping on a second PLMN.

19. The non-transitory computer readable memory of claim 18, wherein the predetermined condition corresponds to (i) whether the UE camps on the first PLMN a predetermined number of times within a predetermined duration or (ii) a geographical location of the first PLMN.

20. The non-transitory computer readable memory of claim 18, wherein the predetermined condition comprises a satisfied state or a non-satisfied state, wherein when the predetermined condition is in the non-satisfied state, the at least the portion of the network slice information associated with the first PLMN comprises all the network slice information associated with the first PLMN.

* * * * *